May 19, 1936.  P. O. WOODY  2,041,447
LOCK FOR AUTOMOBILE ENGINE HOODS
Original Filed June 6, 1933
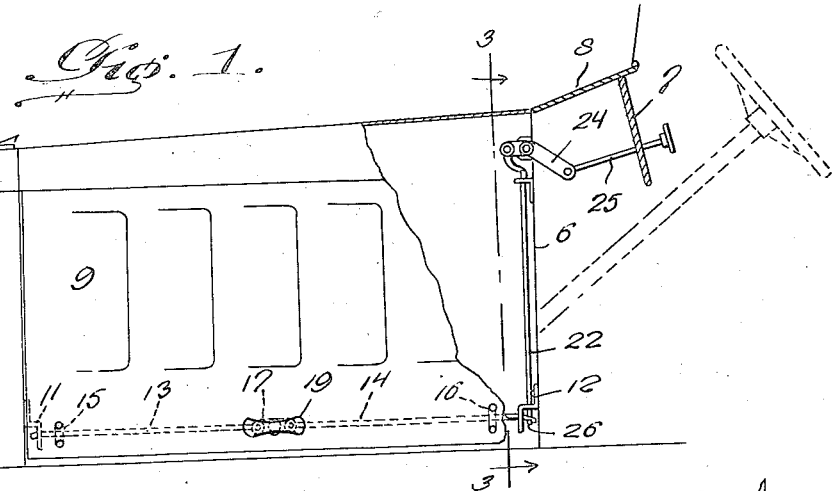
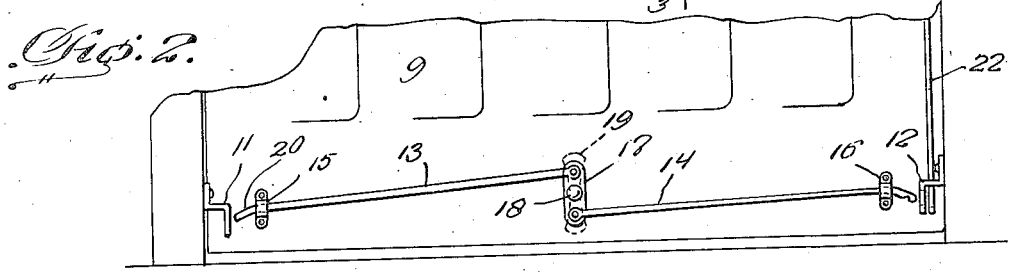
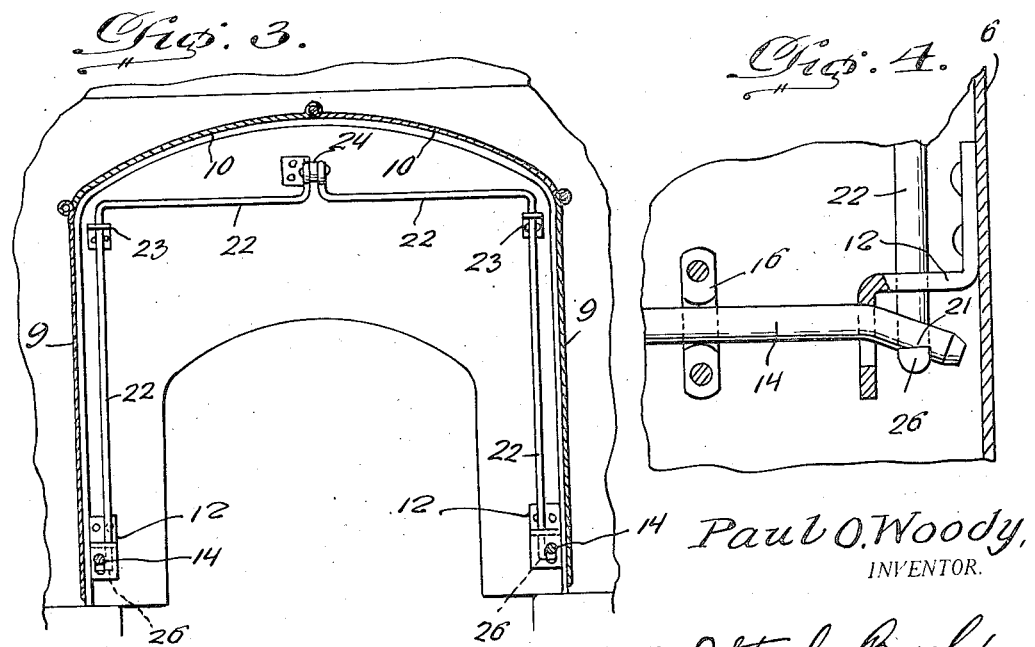
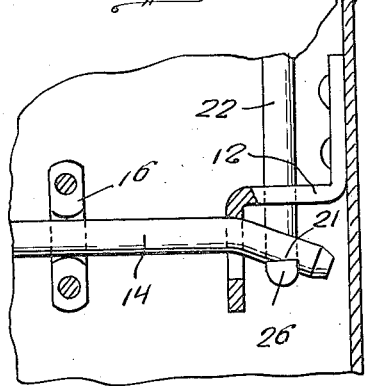
Paul O. Woody,
INVENTOR.
BY J. Stanley Burch
ATTORNEY.

Patented May 19, 1936

2,041,447

UNITED STATES PATENT OFFICE 2,041,447

LOCK FOR AUTOMOBILE ENGINE HOODS

Paul O. Woody, Soda Springs, Idaho

Application June 6, 1933, Serial No. 674,590
Renewed October 17, 1935

1 Claim. (Cl. 292—7)

This invention relates to improvements in locks for engine hoods, and has more particular reference to means whereby the hoods covering the engines of motor vehicles may be conveniently locked in closed condition for preventing tampering with the mechanism of the vehicle within the hood and for preventing theft of the vehicle by making it impossible for unauthorized persons to open the hood and complete the battery circuit of the vehicle engine where the wires of said circuit are exposed within the hood.

Another and more specific object of the invention resides in the provision of locking means of the above kind which may be operated from the driver's seat and which, when in operative position, will effectively prevent unfastening and raising of the hood sections.

Still another object of the invention is to provide a locking means of the above kind which is simple, capable of easy application to motor vehicles now in use, and efficient in operation.

Other objects and features of the invention will become apparent from the following description when considered in connection with the accompanying drawing, in which:

Figure 1 is a fragmentary view, partly in side elevation and partly broken away and in section, showing the present locking means installed upon a motor vehicle.

Figure 2 is an enlarged fragmentary elevational view looking at the inner side of one of the hood sections, and revealing details of the hood fastening and locking means.

Figure 3 is a vertical transverse section on line 3—3 of Figure 1; and

Figure 4 is an enlarged fragmentary section showing an end of one of the hood-securing or fastening bolts in hood-securing position and operatively engaged by the locking bolt for being locked in such position.

Referring more in detail to the drawing, 5 indicates the radiator of a motor vehicle, 6 the dash-board, 7 the instrument board, 8 the cowl, and 9 and 10 respectively the hinged side and top sections which form the engine hood that extends between the radiator 5 and dash-board 6 to cover the engine of the vehicle. These parts may be of any desired or ordinary construction and are only shown to illustrate the application of my locking mechanism.

The locking mechanism includes a manually operable fastening device for each side hood section 9 to hold the same releasably in lowered closed position so that the same may not vibrate or rattle when the vehicle is in motion, and locking mechanism for said fastening devices operable from the driver's seat of the vehicle.

As clearly shown in the several views, each hood fastening device consists of apertured keepers 11 and 12 respectively rigidly fastened to the rear side of the radiator 5 and the front side of the dash-board 6 directly at the inner side of the adjacent side hood section 9 when in proper closed position, a pair of elongated fastening bolts 13 and 14 extending longitudinally of the vehicle at the inner side of said adjacent side hood section 9 and mounted upon the latter in suitable guides 15 and 16 respectively secured on the inner side of the aforesaid side hood section 9 adjacent its front and rear edges, for longitudinally sliding and vertically tilting movement into and out of engagement with the respective keepers 11 and 12. The adjacent inner ends of the bolts 13 and 14 are pivoted to the opposite ends of a cross bar 17 secured on the inner end of a short shaft 18 journaled in the adjacent side hood section 9 and having an operating handle 19 secured on the projecting outer end thereof. It will thus be seen that by turning the handle 19 in one direction the bolts 13 and 14 may be simultaneously projected into engagement with the keepers 11 and 12 to fasten the associated side hood section 9 in lowered closed position, while turning of the handle 19 in the opposite direction will effect simultaneous retraction of the bolts 13 and 14 to disengage them from the keepers 11 and 12 for unfastening the associated side hood section 9 so that the same may be raised or opened. It will be observed that the outer ends of the bolts 13 and 14 are directed downwardly at a slight inclination as at 20 and such bolts are so mounted that when they are projected the down turned ends 20 have a cam action upon the keepers 11 and 12 so as to draw the side hood sections 9 tightly down into closed position so that rattling of the side hood sections 9 will be prevented when closed and fastened and while the vehicle is in motion. It will further be observed that when the cross bar 17 is operated to project the bolts 13 and 14, the latter will be tilted slightly in a vertical direction so as to accentuate this cam action and assist in the drawing of the hood sections 9 downwardly into snug contact with the portions of the radiator and dash-board upon which the ends of the hood sections rest when in closed position, thereby assisting in preventing rattling of said hood sections. The rear or free outer ends of the rearmost fastening bolts 14 of the fastening devices for the side hood sections 9 are provided in their under sides with notches 21 for engagement by the bolts of a locking means or mechanism as will be presently described, whereby manual unfastening of the side hood sections 9 through the mere operation of handles 19 by an unauthorized person, will be prevented.

The locking means or mechanism consists of a pair of angular locking rods or bolts 22 having vertical portions vertically slidable in guides 23 mounted on the front side of dash-board 6 at the inner sides of the respective side hood sections 9, and inwardly extending upper horizontal portions pivoted to the forwardly projecting end of a lever 24 pivoted to and extending rearwardly through the dashboard 6. The lever 24 is pivoted at its rear end to the forward end of an operating rod 25 loosely slidably extending through the instrument board 7 to a point within convenient reach from the driver's seat of the vehicle. The vertical portions of locking bolts 22 terminate in outwardly directed laterally extending lower ends 26 normally positioned below the path of movement of the free ends of bolts 14 when said locking bolts 22 are lowered by rearward pull upon rod 25. The arrangement is such that when the bolts 14 are projected to hood-fastening position as shown in Figures 1 and 4, and the rod 25 is pushed forwardly so as to elevate the locking bolts 22, the lateral ends 26 of said bolts 22 will be elevated to engage in the notches 21 of bolts 14 so as to effectively lock the latter and the bolts 13 against manual retraction or release from the keepers 11 and 12 by mere actuation of handle 19. Any suitable means may be provided for locking the push rod 25 against unauthorized actuation, although such a means will not be required in connection with vehicles of the closed body type having locks on the doors thereof, it being obvious that locking of such doors will prevent access to the rod 25 which is located within the body of the vehicle. An authorized person having access to the interior of the vehicle body may readily actuate push rod 25 so as to lower locking bolts 22 and thereby disengage the latter from the bolts 14, whereby the handles 19 may be freely subsequently actuated to retract and release the fastening bolts 13 and 14 and permit raising of the hood sections 9.

From the foregoing description, it will be apparent that I have provided an extremely simple and efficient locking mechanism which will effectively prevent the release and opening of the hood of a motor vehicle by unauthorized persons, thereby preventing tampering with the mechanism within the hood, preventing the theft of the generator, starting motor, carbureter, and such other devices as are found under the hoods of motor vehicles, and discouraging theft of the automobile or motor vehicle by preventing closing of the battery or ignition circuit of the vehicle engine where the wires of said circuit are exposed within the hood. Minor changes are contemplated within the spirit and scope of the invention as claimed.

What I claim as new is:

Locking means for the engine hood fastening device of an automobile, wherein said fastening device embodies a longitudinally movable fastening bolt mounted on the inner side of the engine hood and manually movable rearwardly into and forwardly out of engagement with a keeper fixed to the rear support for the engine hood, comprising a locking bolt, means mounting said locking bolt on the rear hood support for vertical sliding movement, said fastening bolt having a notch in its rear keeper-engaging end, said locking bolt having its lower end engageable in said notch of the fastening bolt to secure the latter in keeper-engaging position when said locking bolt is slid vertically in one direction and disengageable from said notch to release the fastening bolt when said locking bolt is slid in the opposite direction, said locking bolt having an upper end portion, and means manually operable from the driver's seat of the automobile and connected to said upper end portion of the locking bolt for sliding said locking bolt to engage its lower end in or disengage the same from the notch of said fastening bolt.

PAUL O. WOODY.